US008093999B2

(12) United States Patent
Bauer et al.

(10) Patent No.: US 8,093,999 B2
(45) Date of Patent: Jan. 10, 2012

(54) DRIVER ASSISTANCE SYSTEM AND METHOD WITH OBJECT DETECTION FACILITY

(75) Inventors: Guenter Bauer, Petershausen (DE); Stephan Thoma, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 27 days.

(21) Appl. No.: 12/397,803

(22) Filed: Mar. 4, 2009

(65) Prior Publication Data
US 2009/0160630 A1 Jun. 25, 2009

Related U.S. Application Data

(63) Continuation of application No. PCT/EP2007/007404, filed on Aug. 23, 2007.

(30) Foreign Application Priority Data

Sep. 7, 2006 (DE) .......................... 10 2006 041 930

(51) Int. Cl.
*B60Q 1/00* (2006.01)
*G08G 1/16* (2006.01)
*G08G 1/017* (2006.01)
*H04N 7/18* (2006.01)
(52) U.S. Cl. ........ 340/435; 340/436; 340/903; 340/937; 348/148; 701/301
(58) Field of Classification Search .................. 340/435, 340/540
See application file for complete search history.

(56) References Cited

U.S. PATENT DOCUMENTS

| 6,191,704 B1 * | 2/2001 | Takenaga et al. ............. 340/903 |
| 6,590,521 B1 * | 7/2003 | Saka et al. ...................... 342/70 |

(Continued)

FOREIGN PATENT DOCUMENTS

DE 198 26 283 A1 12/1998

(Continued)

OTHER PUBLICATIONS

International Search Report dated Dec. 7, 2007 with English translation (six (6) pages).

(Continued)

*Primary Examiner* — Daniel Wu
*Assistant Examiner* — Pameshanand Mahase
(74) *Attorney, Agent, or Firm* — Crowell & Moring LLP

(57) ABSTRACT

A method is provided for attracting the attention of a motor vehicle driver to a potential hazardous spot in an image, which is illustrated in a real form on a display of the motor vehicle or in a virtual form in a region of the motor vehicle. At least one laser scanner provided in the vehicle scans the surroundings in front of the vehicle and determines the shape of an object and the distance of the object from the vehicle. At least one infrared camera, in particular a thermal imaging camera, is provided on the vehicle. It records the surroundings in front of the vehicle and makes available the real or virtual image of the surroundings for display to the driver. The object is compared with at least a first reference object within the scope of a first pattern recognition process. If there is significant correspondence between the object and the reference object, that area on the real or virtual image displayed to the driver in which the object is to be found is determined. The respective area of the image and/or the respective object is highlighted in the image.

20 Claims, 2 Drawing Sheets

U.S. PATENT DOCUMENTS

| | | | |
|---|---|---|---|
| 2003/0128436 A1* | 7/2003 | Ishii et al. | 359/630 |
| 2004/0164851 A1* | 8/2004 | Crawshaw | 340/435 |
| 2005/0134440 A1* | 6/2005 | Breed | 340/435 |
| 2005/0216181 A1* | 9/2005 | Estkowski et al. | 701/200 |
| 2005/0242306 A1* | 11/2005 | Sirota et al. | 250/559.38 |
| 2008/0106404 A1* | 5/2008 | Joslin et al. | 340/540 |
| 2008/0224837 A1 | 9/2008 | Meyer et al. | |
| 2009/0002141 A1* | 1/2009 | Rinaldi | 340/425.5 |

FOREIGN PATENT DOCUMENTS

| | | |
|---|---|---|
| DE | 101 16 277 A1 | 10/2002 |
| DE | 101 48 070 A1 | 4/2003 |
| DE | 102 61 291 A1 | 7/2003 |
| DE | 10 2004 009 924 A1 | 9/2005 |
| EP | 0 686 857 A2 | 12/1995 |
| EP | 1 291 668 A2 | 3/2003 |
| EP | 1 615 051 A1 | 1/2006 |
| JP | 2003-44995 A | 2/2003 |

OTHER PUBLICATIONS

German Search Report dated Apr. 20, 2007 with English translation (nine (9) pages).

* cited by examiner

DRIVER ASSISTANCE SYSTEM AND METHOD WITH OBJECT DETECTION FACILITY

CROSS-REFERENCE TO RELATED APPLICATIONS

This application is a continuation of PCT International Application No. PCT/EP2007/007404, filed Aug. 23, 2007, which claims priority under 35 U.S.C. §119 to German Patent Application No. DE 10 2006 041 930.8, filed Sep. 7, 2006, the entire disclosures of which are herein expressly incorporated by reference.

BACKGROUND AND SUMMARY OF THE INVENTION

The present invention relates to a system and method for attracting the attention of the driver of a motor vehicle to a potential hazardous spot, in particular, the position of a pedestrian, in an image, which is illustrated on a display of the motor vehicle or in a virtual form in the region of the motor vehicle.

A night vision system for vehicles, in which system an infrared camera is mounted on the vehicle and the infrared image generated by it is illustrated on a display in the vehicle, is known from the prior art. The infrared camera is either a thermal imaging camera for the far infrared range (FIR system) or a camera for the near infrared range (NIR system). In the NIR system, a light source produces corresponding light and the light reflected from the illuminated object is processed by the NIR camera to form an image on the display.

These known systems are entrusted with the task of detecting for the driver potential hazardous spots, such as the position of a pedestrian or vehicles emerging from the wilderness or from dark freeway exits, in the infrared image.

The present invention improves known night vision systems designed for vehicles.

According to the invention, a method is provided for attracting the attention of the driver of a motor vehicle to a potential hazardous spot in an image, which is illustrated in a real form on a display of the motor vehicle or in a virtual form in the region of the motor vehicle. At least one laser scanner provided in the vehicle scans the surroundings in front of the vehicle and determines the shape of an object and the distance of the object from the vehicle. At least one infrared camera, in particular a thermal imaging camera, is provided on the vehicle. The infrared camera records the surroundings in front of the vehicle and makes available the real or virtual image of the surroundings for display to the driver. The object is compared with at least a first reference object within the scope of a first pattern recognition process. If there is significant correspondence between the object and the reference object, that area on the real or virtual image displayed to the driver in which the object is to be found is determined, and the respective area of the image and/or the respective object is highlighted in the image.

A first aspect of the invention is that at least one laser scanner provided in the vehicle scans the surroundings in front of the vehicle and determines the shape of an object and the distance of the object from the vehicle. The laser scanner is preferably one that emits light in the infrared range and evaluates the light reflected from the object. In known laser scanners, this evaluation of the shape of the object is carried out at a resolution that is still relatively low according to present-day standards, in particular, with regard to the operating time and angle relative to the vehicle.

A second aspect of the invention is that at least one camera, in particular an infrared thermal imaging camera (FIR camera) or a camera that is sensitive in the near infrared range (NIR camera), is provided on the vehicle and it records the surroundings in front of the vehicle and makes available the real or virtual image of the surroundings for display to the driver. The method of the invention is characterized by the refined use of both a laser scanner and a camera that images the surroundings of the vehicle.

A third aspect of the invention is that the object is compared with at least a first reference object within the scope of a first pattern recognition process. The object detected by the laser scanner is preferably classified within the scope of the first pattern recognition process. That is to say, an examination is carried out to determine whether the object detected is, for example, a pedestrian, a four-legged wild animal, a parking space, cars parked one behind the other, etc.

A fourth aspect of the invention is that if there is significant correspondence between the object and the reference object, that area on the real or virtual image displayed to the driver in which the object is to be found is determined.

Finally, a fifth aspect of the invention is that the respective area of the image and/or the respective object is highlighted in the image.

In summary, the present invention upgrades the known night vision system having an imaging camera with a laser scanner, whose signal is evaluated for detecting relevant objects. If a relevant object is detected, then the location of the object in the image provided by the imaging camera is determined. The corresponding area of the image and/or the corresponding object is then clearly identified in the image displayed to the driver in order to attract the attention of the driver to the same when he views the image.

Other objects, advantages and novel features of the present invention will become apparent from the following detailed description of one or more preferred embodiments when considered in conjunction with the accompanying drawing.

DETAILED DESCRIPTION OF THE DRAWING

Figure 1:
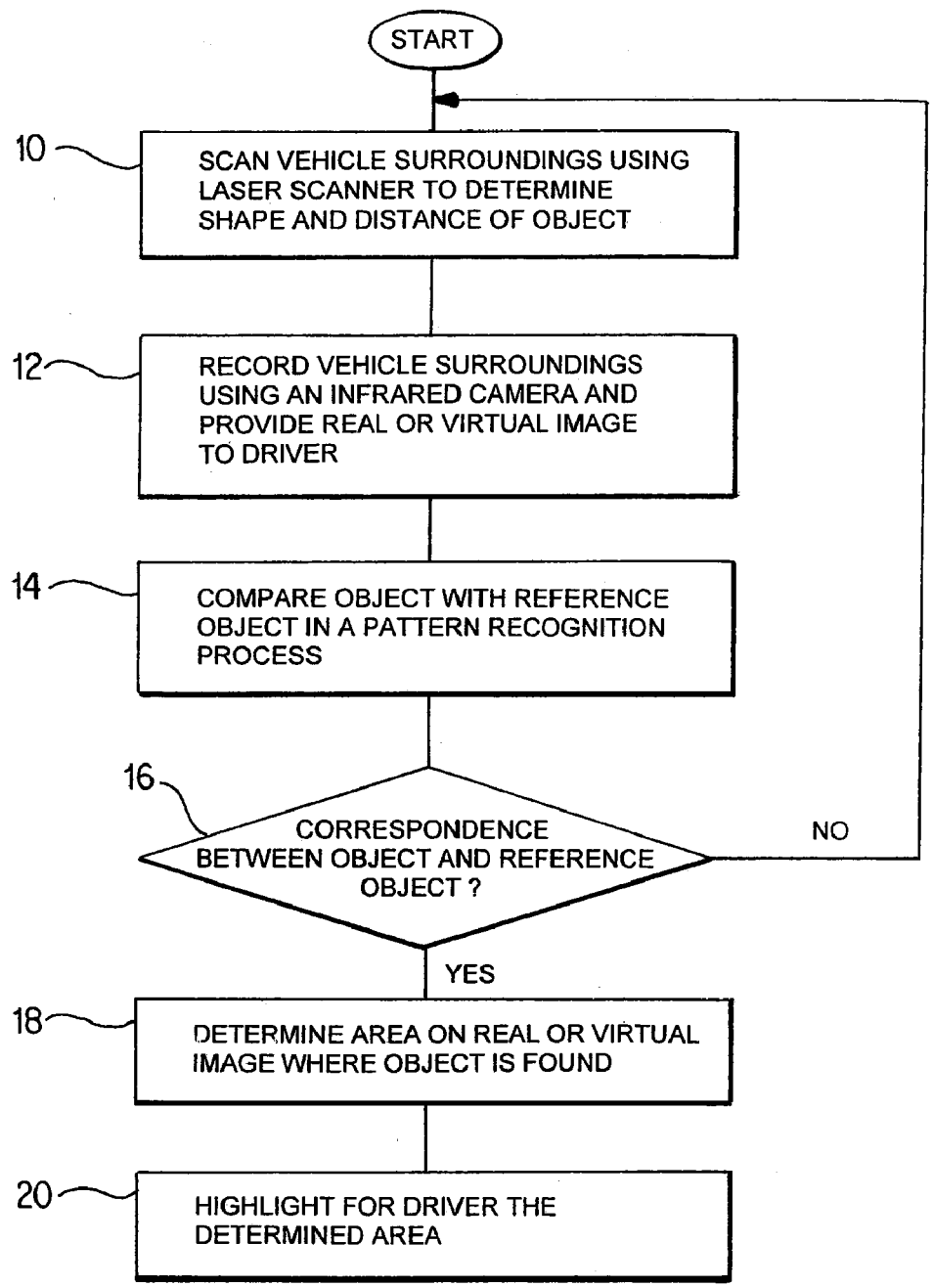
FIG. 1 is a flow chart illustrating an embodiment of the method according to the invention.
Figure 2:
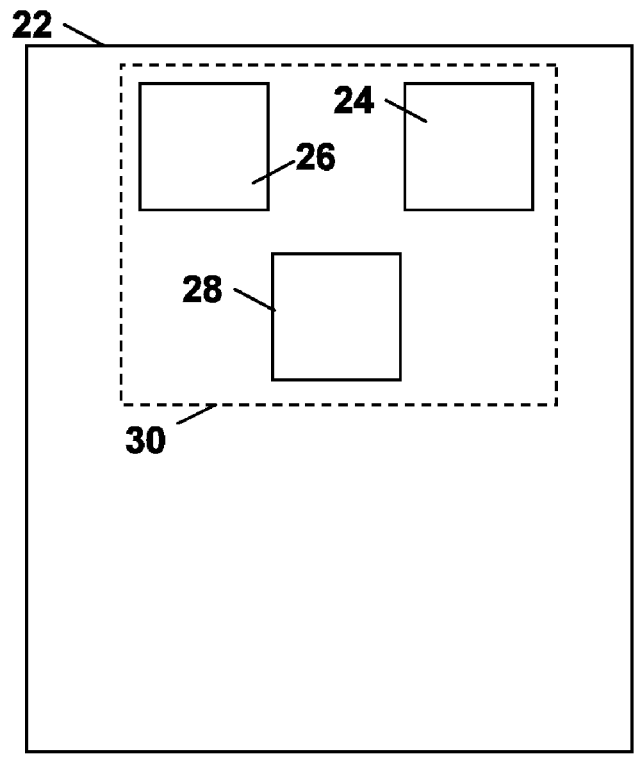
FIG. 2 illustrates a driver assistance system configured to perform the method of FIG. 1.

FIG. 1 is a flow chart illustrating an embodiment of the method. After starting, at least one laser scanner (24) provided in the vehicle (22) scans the surroundings in front of the vehicle and determines the shape of an object and the distance of the object from the vehicle (22)(step 10). At least one camera (26), in particular a FIR camera or a NIR camera, is provided on the vehicle (22) and records the surroundings in front of the vehicle (22) and makes available to the driver the real or virtual image of the surroundings (step 12). The object is then compared with at least a first reference object within the scope of a first pattern recognition process (step 14). Next, the process determines if there is a significant correspondence between the object and the reference object (step 16). If not, the process continues performing steps 10-14. If there is a significant correspondence, then the area on the real or virtual image displayed to the driver in which the object is to be found is determined (step 18). The determined respective area of the image and/or the respective object is highlighted in order to attract the driver's attention (step 20).

In the preferred embodiment of the invention, the image is an infrared image, which has been acquired by a thermal imaging camera.

In one embodiment of the invention, the respective area of the image and/or the respective object in the image is compared with at least a second reference object within the scope of a second pattern recognition process. The respective area of the image and/or the respective object is highlighted in the image if both the first and the second comparisons each show significant correspondence. It is thus possible to increase the reliability of the detection of relevant objects, obstacles or potential obstacles and reduce the number of false alarms or occasions when the driver is erroneously distracted by highlights in the image.

In a further embodiment of the invention, the first reference object has an L-shape in order to determine whether and, if so, where the scan display of the laser scanner has at least an L-shape. The scanning signal or the scan display of a laser scanner shows an L-shape in proximity to a car parked on the side of the road. It is thus possible to examine whether the vehicle is approaching parked cars.

In a further development, the first reference object has two spaced L-shapes in order to determine whether and, if so, where the scan display of the laser scanner has at least two spaced L-shapes. It is thus possible to examine whether the vehicle equipped with the laser scanner is approaching two vehicles parked one behind the other. In such a traffic situation there is an increased risk of children or adults passing between parked cars and suddenly standing on the road. If, in dark surroundings, such a situation is detected in the evaluated signal of the laser scanner and/or in the infrared image of the infrared camera in the method of the invention, the corresponding position or the corresponding area or the respective person is clearly identified in the infrared image displayed to the driver. Furthermore, this situation can also be indicated by means of an optical and/or audible warning signal.

In a still further development, the moving object is compared with a moving first reference object within the scope of the first pattern recognition process. The rate of detection can be increased distinctly in many situations by comparing a sequence of images instead of an individual image within the scope of the pattern recognition process. The occurring changes can be characteristic of a defined traffic situation requiring detection.

In yet another development, the object moving in the real or virtual image is alternatively or additionally (also) compared with a moving second reference object within the scope of the second pattern recognition process. It is thus possible to further increase the rate of detection of critical situations or of potential hazardous spots.

In another embodiment, the first and/or second pattern recognition processes are carried out continuously. This enables continuous assistance to the driver, in particular, while driving in the dark or in conditions of poor visibility.

In a further embodiment, the virtual image is generated by use of a head-up display (28) in front of the windshield of the vehicle (22). This enables the driver to continuously observe the traffic occurrences without being distracted by having to repeatedly glance at the display mounted in the dashboard. Furthermore, the driver is usually likely to notice immediately when an object is clearly identified in the virtual image.

In a preferred embodiment, the laser scanner scans objects with the help of laser beams having a wavelength located in the near or far infrared range. Such laser scanners are already available for automotive applications and can therefore be used cost-effectively in the method.

In another development, the laser scanner determines the size and/or the speed of objects and an examination is carried out within the scope of the first pattern recognition process as to whether the object has a size and/or speed, which corresponds to the typical size of a first reference object and/or the speed of a first reference object. It is thus possible to further increase the rate of detection of relevant objects since more criteria or data are provided for comparison with reference objects.

Finally, a driver assistance system (30) is provided for the motor vehicle (22) that is operatively configured to perform the method according to the invention, which system achieves the advantageous characteristics of the method of the invention.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for attracting attention of the driver in a motor vehicle to a potential hazardous spot, the method comprising the acts of:

scanning surroundings in front of the vehicle using at least one laser scanner in the vehicle and determining a shape of an object and a distance of the object from the vehicle;

recording the surroundings in front of the vehicle using at least one thermal imaging camera provided in the vehicle and making available a real image or a virtual image of the surroundings for display;

comparing the shape of the object with at least a first reference object utilizing a first pattern recognition process;

if, based on said comparing, a significant correspondence occurs between the shape of the object and the at least first reference object, determining an area on the real or virtual image displayed to the driver in which the object is to be found; and highlighting, if the significant correspondence occurs between the shape of the object and the at least first reference object, at least one of the determined area of the real or virtual image and the respective object to be found in that area.

2. The method according to claim 1, wherein the image is an infrared image acquired by the thermal imaging camera.

3. The method according to claim 1, wherein the determined area of the image and/or the respective object in the image is compared with at least a second reference object utilizing a second pattern recognition process, and further wherein the determined area of the image and/or the respective object is highlighted in the image if both the first and the second comparisons show significant correspondence.

4. The method according to claim 2, wherein the determined area of the image and/or the respective object in the image is compared with at least a second reference object utilizing a second pattern recognition process, and further wherein the determined area of the image and/or the respective object is highlighted in the image if both the first and the second comparisons show significant correspondence.

5. The method according to claim 1, wherein the first reference object has an L-shape in order to determine whether and, if so, where the laser scan has at least an L-shaped object.

6. The method according to claim 1, wherein the first reference object has two spaced L-shapes in order to determine whether and, if so, where the laser scan has at least two spaced L-shapes.

7. The method according to claim 1, wherein a shape of a moving object is compared with a moving first reference object utilizing the first pattern recognition process.

8. The method according to claim 7, wherein the shape of the object moving in the real or virtual image is compared with a moving second reference object utilizing a second pattern recognition process.

9. The method according to claim 1, wherein the first pattern recognition process is carried out continuously.

10. The method according to claim 3, wherein the first and the second pattern recognition processes are carried out continuously.

11. The method according to claim 7, wherein the first pattern recognition process is carried out continuously.

12. The method according to claim 8, wherein the first and the second pattern recognition processes are carried out continuously.

13. The method according to claim 1, wherein the virtual image is generated by a head-up display in front of a windshield of the vehicle.

14. The method according to claim 1, wherein the laser scanner scans objects using laser beams having a wavelength located in a near or far infrared range.

15. The method according to claim 1, wherein the laser scanner determines the size and/or the speed of objects and an examination is carried out utilizing the first pattern recognition process as to whether the object has a size and/or speed, which corresponds to a typical size of a first reference object and/or the speed of a first reference object.

16. The method according to claim 14, wherein the laser scanner determines the size and/or the speed of objects and an examination is carried out utilizing the first pattern recognition process as to whether the object has a size and/or speed, which corresponds to a typical size of a first reference object and/or the speed of a first reference object.

17. A driver assistance system for a motor vehicle, comprising:
  at least one laser scanner arranged in the vehicle, the scanner scanning surroundings in front of the vehicle and determining a shape of an object and a distance of the object from the vehicle;
  a thermal imaging camera arranged in the vehicle, the thermal imaging camera recording surroundings in front of the vehicle and generating a real or virtual image of the surroundings; and
  a display for displaying the real or virtual image of the surroundings, wherein if there is a significant correspondence between the shape of the object and the first reference object, an area on the display in which the object is found is determined and the determined area and/or the object is highlighted in the image on the display,
  wherein the driver assistance system processor is further configured to compare the shape of the object with at least a first reference object to determine whether there is a significant correspondence between the shape of the object and the first reference object.

18. The driver assistance system according to claim 17, wherein the determined area and/or the object in the image is compared with at least a second reference object utilizing a second pattern recognition process, and further wherein the determined area of the image and/or the respective object is highlighted if both the first and the second comparisons find a significant correspondence.

19. The driver assistance system according to claim 18, wherein the first reference object has an L-shape, which L-shape is compared against the object determined by the at least one laser scanner.

20. The driver assistance system according to claim 17, wherein the first reference object has two spaced L-shapes, which two spaced L-shapes are compared against the object determined by the at least one laser scanner.

* * * * *